United States Patent
Hirayanagi

(10) Patent No.: US 8,162,123 B2
(45) Date of Patent: Apr. 24, 2012

(54) FRICTION PLATE FOR WET-TYPE MULTIPLATE CLUTCH

(75) Inventor: Tsuyoshi Hirayanagi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 669 days.

(21) Appl. No.: 11/964,201

(22) Filed: Dec. 26, 2007

(65) Prior Publication Data
US 2008/0156611 A1  Jul. 3, 2008

(30) Foreign Application Priority Data
Dec. 27, 2006 (JP) .................... 2006-350924

(51) Int. Cl.
F16D 13/64 (2006.01)
F16D 13/72 (2006.01)

(52) U.S. Cl. ............... 192/113.36; 192/107 R

(58) Field of Classification Search .............. 192/113.36
See application file for complete search history.

(56) References Cited

U.S. PATENT DOCUMENTS

| | | | | |
|---|---|---|---|---|
| 2,690,248 A * | 9/1954 | McDowall | ............ | 192/113.36 |
| 3,048,250 A * | 8/1962 | Kershner | .............. | 192/107 R |
| 4,674,616 A * | 6/1987 | Mannino, Jr. | ............ | 192/107 R |
| 5,776,288 A * | 7/1998 | Stefanutti et al. | ......... | 192/113.36 |
| 6,062,367 A | 5/2000 | Hirayanagi et al. | | |
| 6,145,645 A * | 11/2000 | Kroll et al. | ............ | 192/113.36 |
| 7,172,062 B2 | 2/2007 | Kitahara et al. | | |
| 7,789,209 B2 * | 9/2010 | Miyazaki et al. | ........ | 192/70.12 |
| 2007/0017773 A1 | 1/2007 | Suzuki et al. | | |
| 2007/0102258 A1 * | 5/2007 | Miyazaki et al. | ........ | 192/113.36 |
| 2007/0199794 A1 | 8/2007 | Miyazaki et al. | | |
| 2008/0173516 A1 * | 7/2008 | Hirayanagi | ............ | 192/210 |
| 2008/0302625 A1 * | 12/2008 | Takayanagi | ............ | 192/107 R |

FOREIGN PATENT DOCUMENTS
JP 11-141570 5/1999
JP 2005-076759 3/2005

* cited by examiner

*Primary Examiner* — Rodney Bonck
(74) *Attorney, Agent, or Firm* — Kenealy Vaidya LLP

(57) ABSTRACT

A friction plate for a wet-type multiplate clutch is provided with a core plate and friction linings bonded on opposite sides of the core plate, respectively. Each of the friction linings is composed of plural segment pieces each have at least one first oil groove and at least one second oil groove. The first oil groove opens to a radially-inner side of its corresponding segment piece and has a closed end portion located in a radially-intermediate part of the corresponding segment piece. The second oil groove opens to a radially-outer side of the corresponding segment piece and has a closed end portion located in another radially-intermediate part of the corresponding segment piece. Each segment piece is provided with at least one press-formed oil groove as one of the first and second oil grooves and at least one punched-out oil groove as the other one of the first and second oil grooves.

10 Claims, 7 Drawing Sheets

ND STATES PATENT

FRICTION PLATE FOR WET-TYPE MULTIPLATE CLUTCH

CROSS-REFERENCE TO RELATED APPLICATION

This application claims the priority of Japanese Patent Application 2006-350924 filed Dec. 27, 2006, which is incorporated herein by reference.

FIELD OF THE INVENTION

This invention relates to a friction plate for a wet-type multiplate clutch useful as a clutch, a brake or the like in an automatic transmission.

BACKGROUND OF THE INVENTION

FIG. 1 is a cross-sectional view illustrating the fundamental construction of a wet-type multiplate clutch 10, which serves to transmit power between a clutch casing 21 and a hub 22. FIG. 1 shows a spline groove 23 maintained in fitting engagement with separator plates 30, a spline groove 24 maintained in fitting engagement with friction plates 40, a piston 25 for pressing the separator plates 30 and friction plates 40, a backing plate 26 against which the plates 30,40, a snap ring 27 supporting the backing plate 26, and a sealing ring 28 for the piston 25.

In the wet-type multiplate clutch 10, the friction plates 40 and separator plates 30 are alternately arranged between the clutch casing 21 and the hub 22. Engagement or disengagement of the clutch 10 is effected by pressing the friction plates 40 and separator plates 30 with the piston 25 or by canceling the pressing of these plates 40,30.

Recently, there is an ever-increasing demand for improvements in the fuel economy of automobiles. Keeping in step with this trend, there is an outstanding demand for a further reduction in the idling drag between friction plates and separator plates during non-engagement of a clutch in an automatic transmission.

There have hence been contemplated friction plates provided with friction linings, each of which has one or more oil grooves having closed ends to separate the friction plates from their associated separator plates during non-engagement of a clutch and also has one or more oil passages extending radially through the friction lining to feed lube oil onto a friction surface for the prevention of seizure during engagement of the clutch. (see, for example, JP-A-11-141570 and JP-A-2005-76759)

To improve the shift response in an attempt to make not only an improvement in fuel economy and but also improvements in engine performance, the clearances between friction plates and their associated separator plates have become smaller in recent years than before, tending to result in a greater drag torque due to intervening oil films during idling.

With such conventional friction plates, no sufficient drainage of lube oil is feasible on their friction surfaces, thereby failing to satisfactorily meet the demand for a further reduction in drag torque. Especially during rotation in a low-speed range, the drainage of intervening lube oil between the friction plates and the associated separator plates is not sufficient so that the drag torque cannot be reduced.

SUMMARY OF THE INVENTION

To solve the above-described problem, the present invention provides a friction plate for a wet-type multiplate clutch, said friction plate being provided with a core plate and friction linings bonded on opposite sides of the core plate, respectively, each of said friction linings being composed of plural segment pieces each having at least one first oil groove and at least one second oil groove, said first oil groove opening to a radially-inner side of its corresponding segment piece and having a closed end portion located in a radially-intermediate part of the corresponding segment piece, and said second oil groove opening to a radially-outer side of the corresponding segment piece and having a closed end portion located in another radially-intermediate part of the corresponding segment piece, wherein each segment piece is provided with at least one press-formed oil groove as one of the first and second oil grooves and at least one punched-out oil groove as the other one of the first and second oil grooves.

Owing to the above-described construction, the present invention has made it possible to reduce a drag torque during idling of a clutch and also to avoid grabbing in an initial stage of engagement of the clutch.

DETAILED DESCRIPTION OF THE INVENTION AND PREFERRED EMBODIMENTS

The yield of friction linings can be improved by forming each friction lining into segment pieces to be bonded at angular intervals on a core plate.

An oil groove permits a still smoother flow of lube oil upon drainage when it is formed in such a V-shape that it becomes wider toward its open end.

Further, the combined use of at least one punched-out oil groove and at least one press-formed oil groove as the first and second oil grooves has made it possible to provide the friction plate with desired performance.

Friction plates according to various embodiments of the present invention are shown in FIG. 2 through FIG. 11. All of these figures are common in that plural segment pieces of a friction lining, said plural segment pieces being bonded at angular intervals on each side of a core plate 40A, are each provided with at least one first oil groove and at least one second oil groove formed therein. Reference sign 40B indicates spline teeth arranged on an inner circumference of the core plate 40A. It is to be noted that in each embodiment, only one of the segment pieces will be described for the sake of brevity because the segment pieces are identical to each other.

Figure 1:
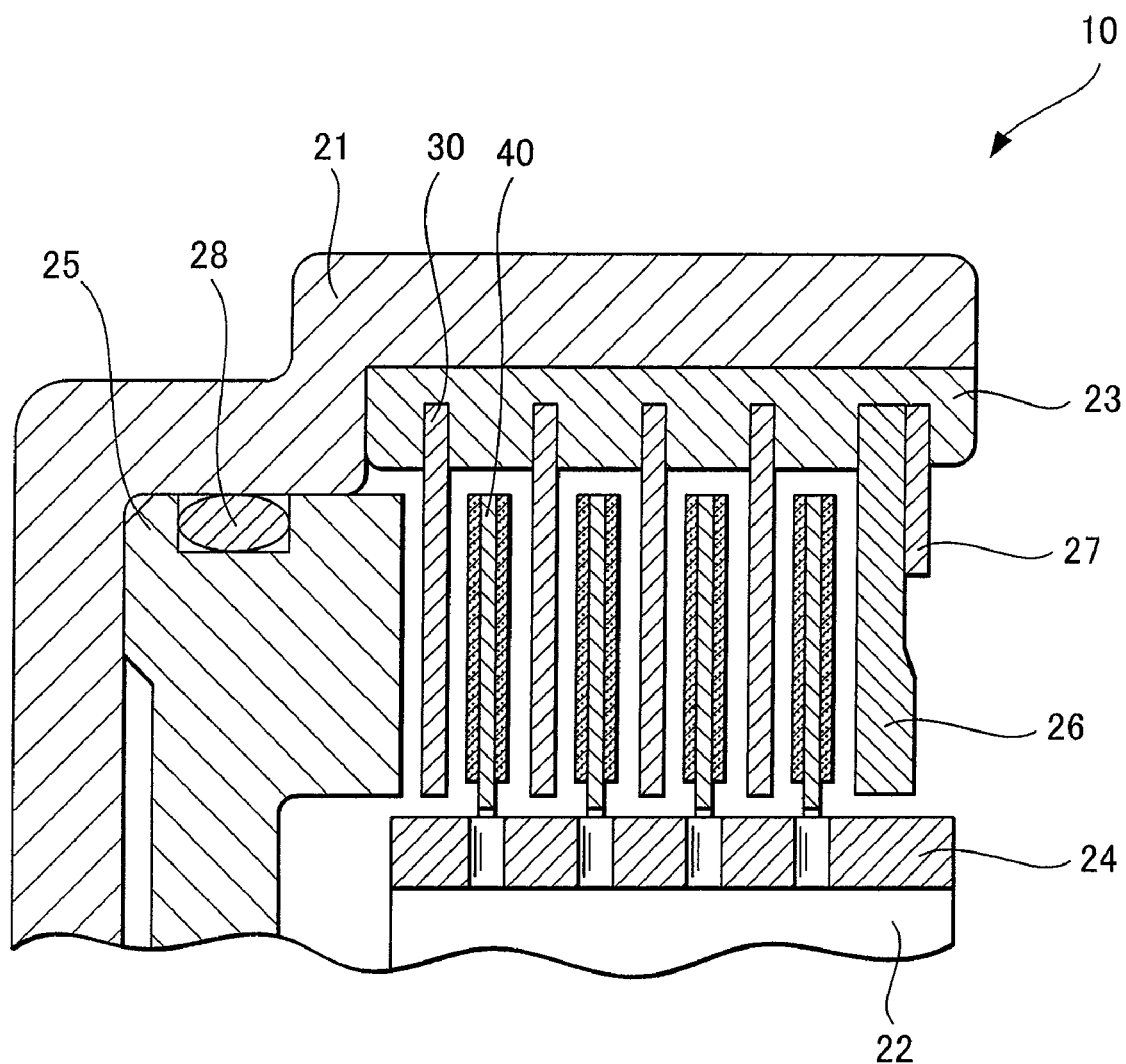
FIG. 1 is a cross-sectional view illustrating the fundamental construction of a wet-type multiplate clutch.
Figure 2:
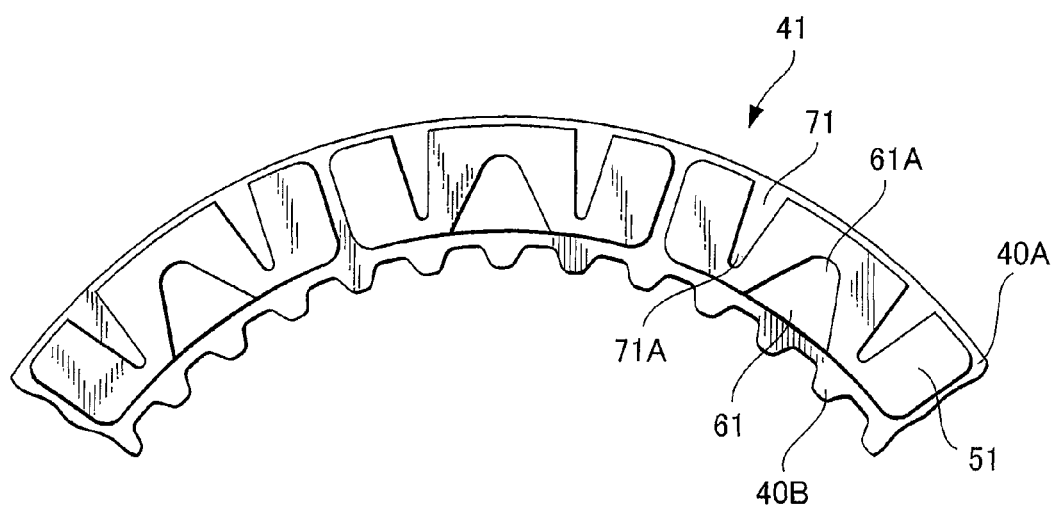
FIG. 2 is a fragmentary plan view of a friction plate according to a first embodiment of the present invention.

Each segment piece 51 on a friction plate 41 according to the second embodiment of the present invention as illustrated in FIG. 2 is provided with one press-formed oil groove 61 as a first oil groove and two punched-out oil grooves 71 as second oil grooves. These grooves 61,71 are each in the form of such a V-shape that it becomes wider toward its open end to facilitate a flow of lube oil.

Because the lube oil is drained to the outside through the punched-out oil grooves 71 opening to the radially-outer side, it is possible to reduce a drag torque upon idling. Frictional heat is also removed together with the lube oil, so that the heat resistance of the friction lining is improved.

In general, oil grooves which are formed in friction linings bonded on friction plates, open to the radially-inner side of the friction linings and have closed ends—can keep uniform the clearances between the friction plates and their associated separator plates during idling owing to the action that separate the friction plates and the separator plates from each other and, when the clutch is disengaged, can smoothly separate the friction plates and the separator plates from each other. These oil grooves are, therefore, effective in reducing an idling torque. In the case of punched-out oil grooves, however, the lube oil in the friction lining flows out into the oil grooves through cooling vents in the initial stage of clutch engagement so that the lube oil on the friction surfaces is quickly drained. The cushioning effect of the lube oil is, therefore, reduced to cause abrupt grabbing of the clutch in the initial stage of clutch engagement. Owing to the arrangement of the press-formed oil groove 61 as the first oil groove in the first embodiment to avoid such abrupt grabbing, the cooling vents in the side walls of the oil groove have been caused to collapse. In the initial stage of clutch engagement, the lube oil in the friction lining is not drained into the press-formed oil groove 61 but is drained onto the friction surface. The lube oil, therefore, acts as a cushion, thereby avoiding grabbing in the initial stage of clutch engagement.

Figure 3:
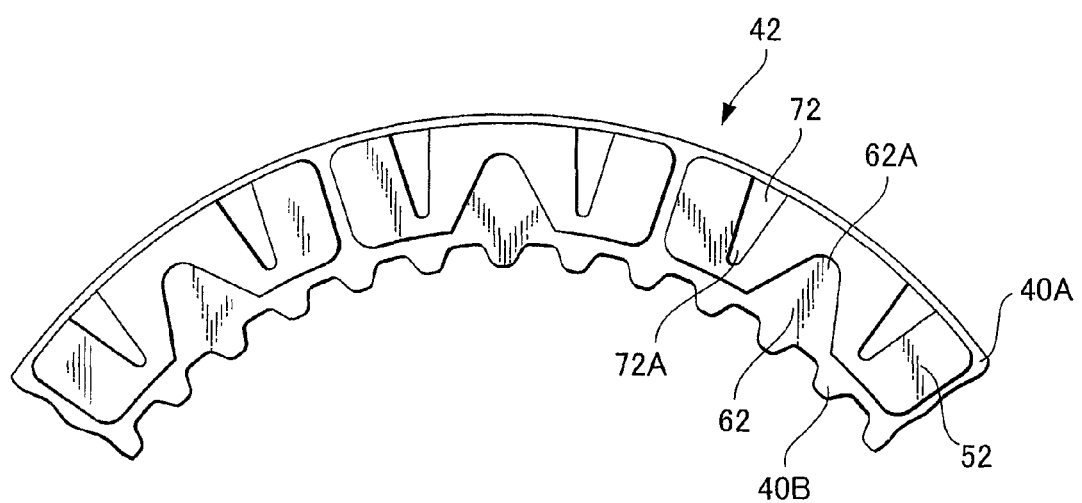
FIG. 3 is a fragmentary plan view of a friction plate according to a second embodiment of the present invention.

FIG. 3 shows some segment pieces 52 on a friction plate 42 according to the second embodiment of the present invention. Each segment piece 52 is provided with one punched-out oil groove 62 as a first oil groove and two press-formed oil grooves 72 as second oil grooves.

Figure 4:
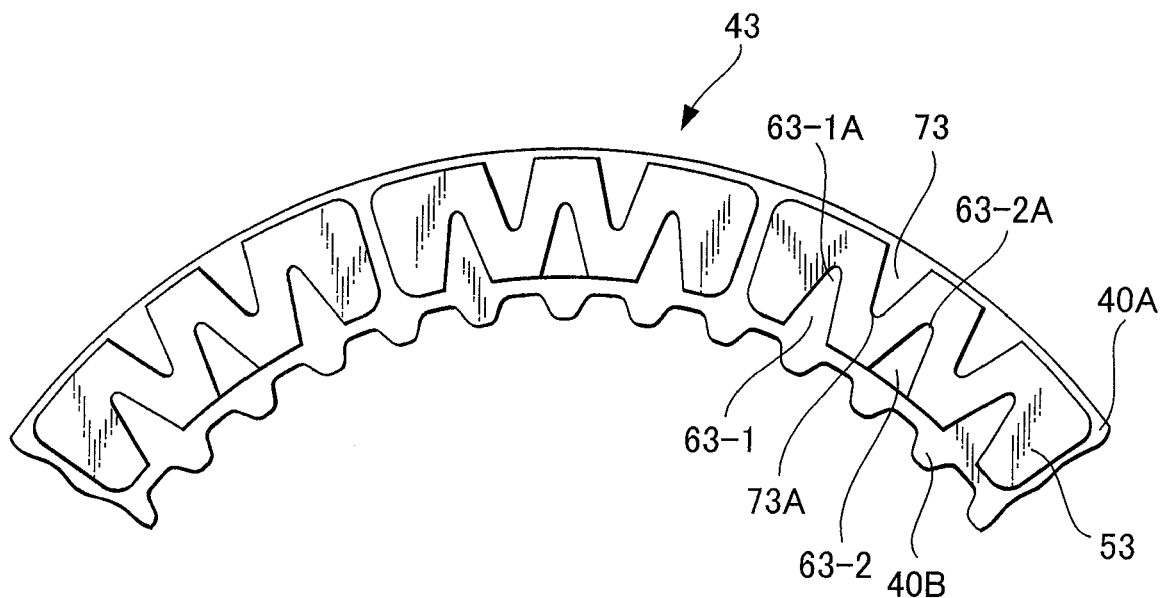
FIG. 4 is a fragmentary plan view of a friction plate according to a third embodiment of the present invention.

FIG. 4 depicts some segment pieces 53 on a friction plate 43 according to the third embodiment of the present invention. Each segment piece 53 is provided with a combination of two punched-out oil grooves 63-1 and one press-formed oil groove 63-2 as first oil grooves and two punched-out oil grooves 73 as second oil grooves.

Figure 5:
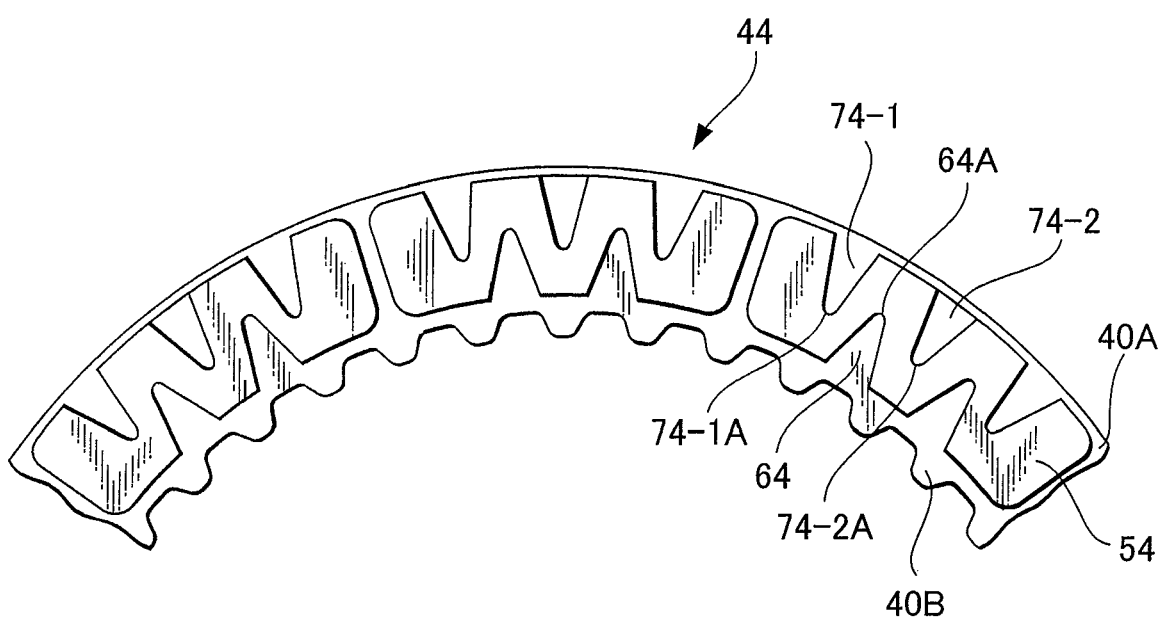
FIG. 5 is a fragmentary plan view of a friction plate according to a fourth embodiment of the present invention.

FIG. 5 illustrates some segment pieces 54 on a friction plate 44 according to the fourth embodiment of the present invention. Each segment piece 54 is provided with two punched-out oil grooves 64 as first oil grooves and a combination of two punched-out oil grooves 74-1 and one press-formed oil groove 74-2 as second oil grooves.

Figure 6:
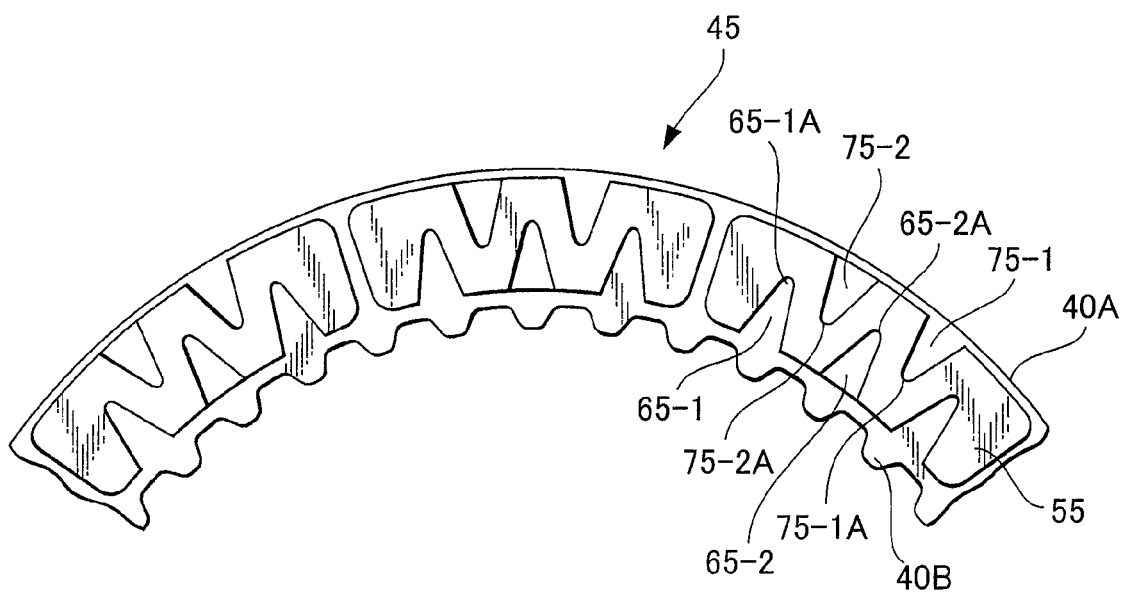
FIG. 6 is a fragmentary plan view of a friction plate according to a fifth embodiment of the present invention.

FIG. 6 shows some segment pieces 55 on a friction plate 45 according to the fifth embodiment of the present invention. Each segment piece 55 is provided with a combination of two punched-out oil grooves 65-1 and one press-formed oil groove 65-2 as first oil grooves and a combination of one punched-out oil groove 75-1 and one press-formed oil groove 75-2 as second oil grooves.

Figure 7:
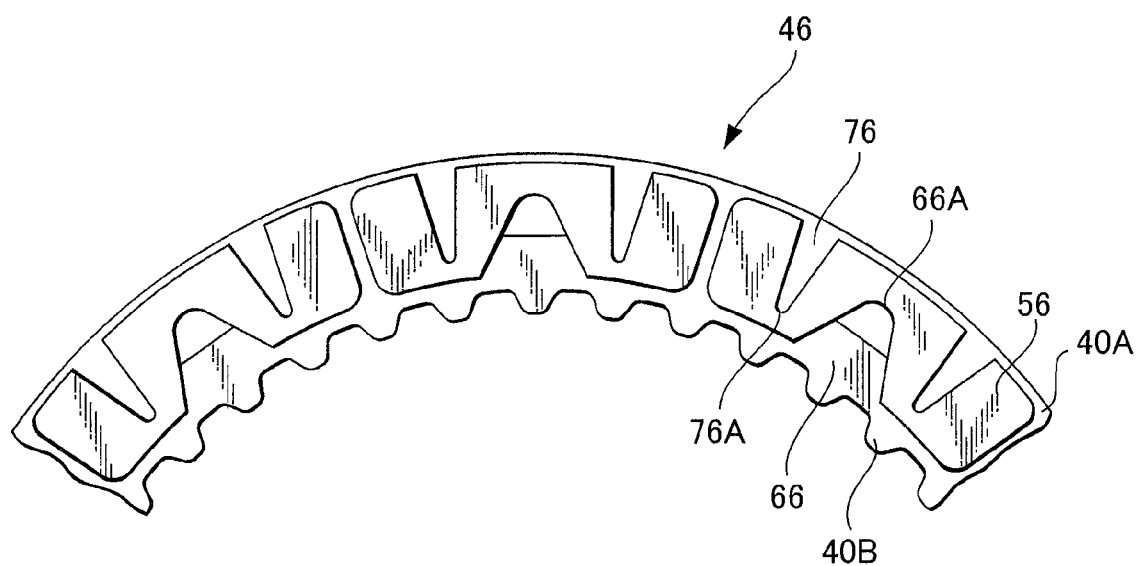
FIG. 7 is a fragmentary plan view of a friction plate according to a sixth embodiment of the present invention.

FIG. 7 depicts some segment pieces 56 on a friction plate 46 according to the sixth embodiment of the present invention. Each segment piece 56 is provided with a combined punched-out/press-formed oil groove 66 as a first oil groove and two punched-out oil grooves 76 as second oil grooves. As illustrated in the figure, the combined punched-out/press-formed oil groove 66 is composed of a punched-out groove portion and a press-formed groove portion.

Figure 8:
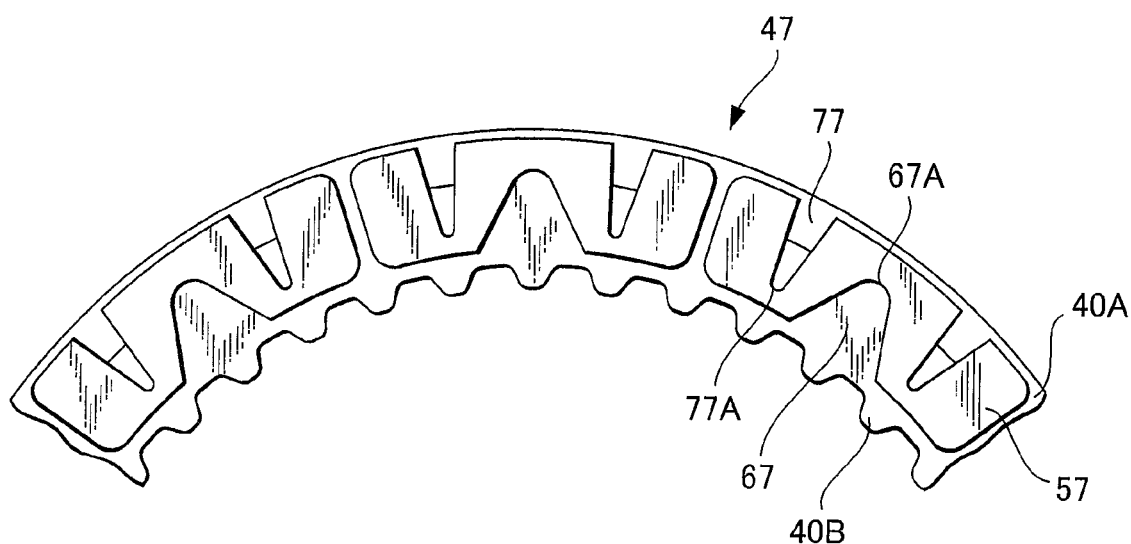
FIG. 8 is a fragmentary plan view of a friction plate according to a seventh embodiment of the present invention.

FIG. 8 illustrates some segment pieces 57 on a friction plate 47 according to the seventh embodiment of the present invention. Each segment piece 57 is provided with a punched-out oil groove 67 as a first oil groove and a combination of two combined punched-out/press-formed oil grooves 77 as second oil grooves. As illustrated in the figure, the combined punched-out/press-formed oil grooves 77 are each composed of a punched-out groove portion and a press-formed groove portion.

Figure 9:
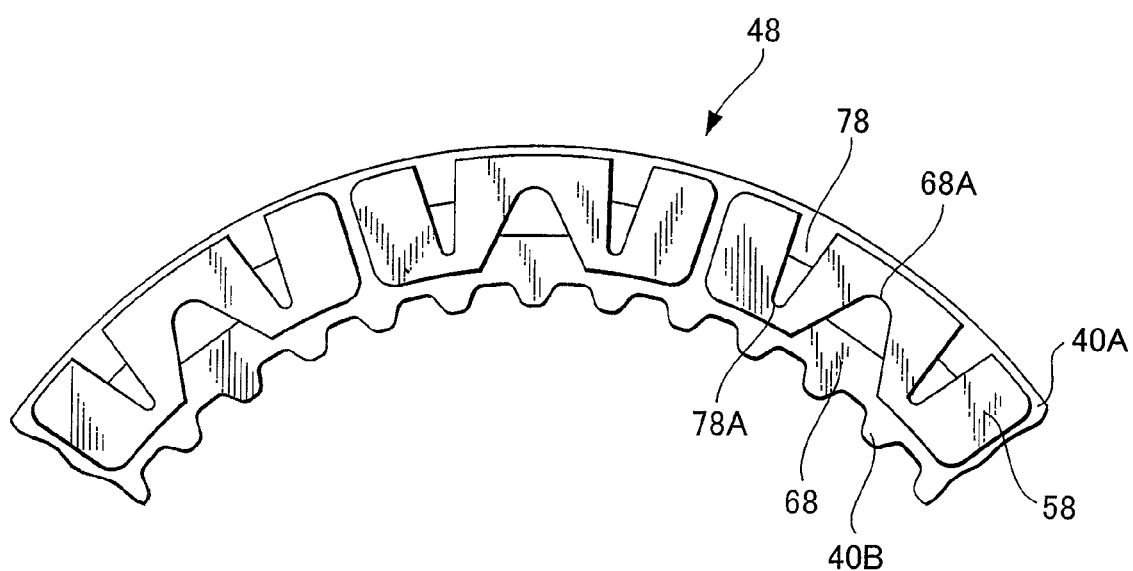
FIG. 9 is a fragmentary plan view of a friction plate according to an eighth embodiment of the present invention.
Figure 10:
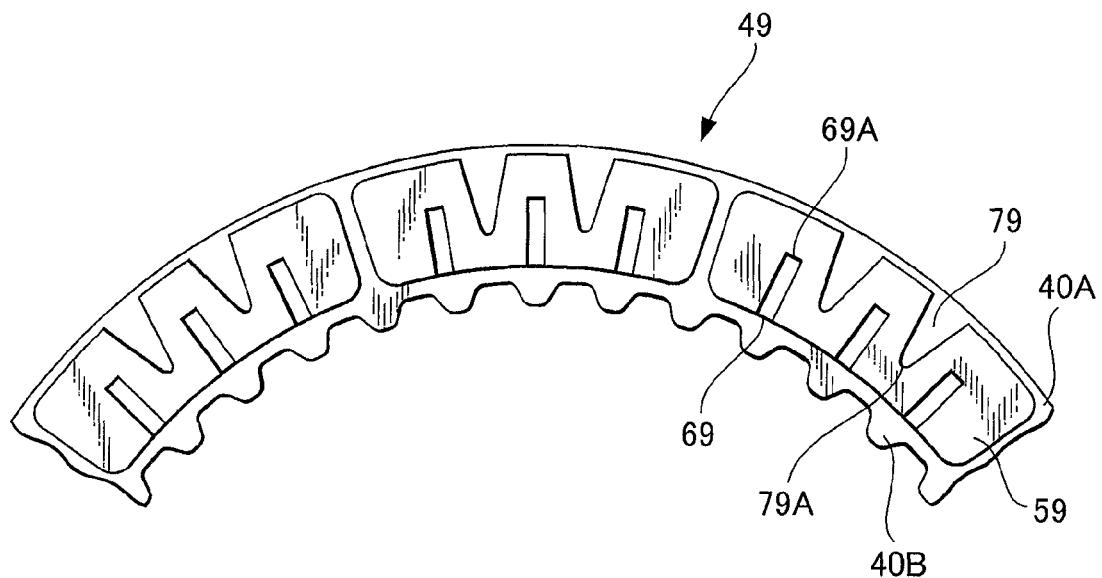
FIG. 10 is a fragmentary plan view of a friction plate according to a ninth embodiment of the present invention.

FIG. 9 shows some segment pieces 58 on a friction plate 48 according to the eighth embodiment of the present invention. Each segment piece 58 is provided with a combined punched-out/press-formed oil groove 68 as a first oil groove and two combined punched-out/press-formed oil grooves 78 as second oil grooves. As illustrated in the figure, each combined punched-out/press-formed oil groove is composed of a punched-out groove portion and a press-formed groove portion.

The oil grooves in the above-described first to eighth embodiments of the present invention are each in the form of such a V-shape that it becomes wider toward its open end. In each of segment pieces 59 on a friction plate 49 according to the ninth embodiment shown in FIG. 10, on the other hand, two punched-out oil grooves 79 as second oil grooves are similar to the two punched-out oil grooves 71 as the second grooves in the first embodiment, but three press-formed oil grooves 69 as first oil grooves are arranged alternately with the two punched-out oil grooves 79, are rectangular, and have the same angular width. Further, in each of segment pieces 510 on a friction plate 410 according to the tenth embodiment depicted in FIG. 11, one punched-out oil groove 610 as a first oil groove is similar to the one punched-out oil groove 62 as the second oil groove in the second embodiment, but instead of each of the two press-formed oil grooves 72 as the second oil grooves in the second embodiment, the segment piece 510 is provided with a combination of one press-formed long oil groove 710-1 and one press-formed short oil groove 710-2 which are the same in angular width but are different in radial length.

Figure 11:
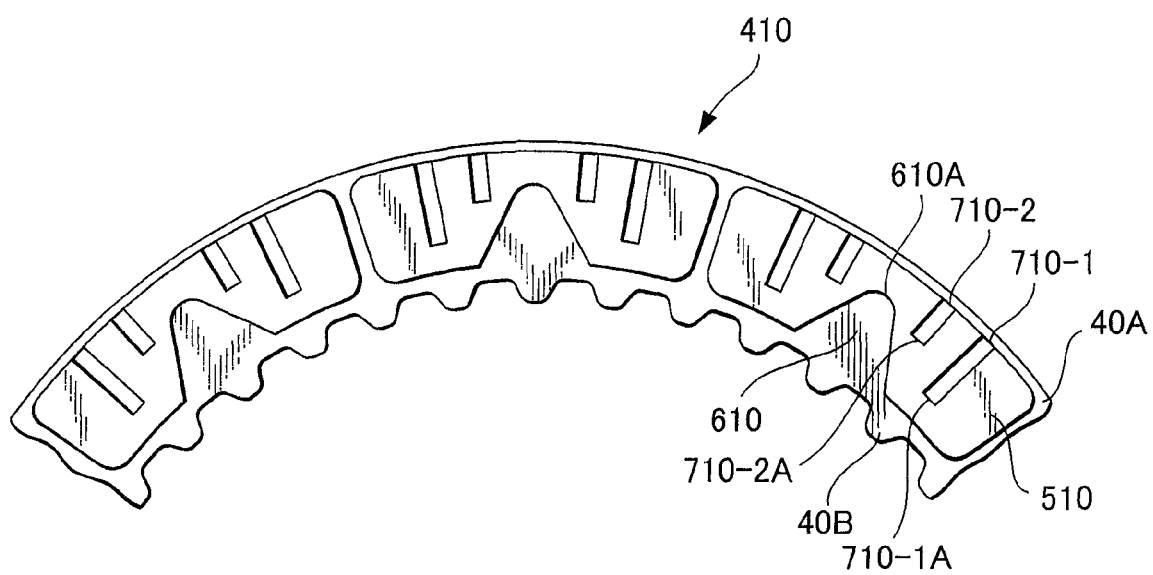
FIG. 11 is a fragmentary plan view of a friction plate according to a tenth embodiment of the present invention.

In FIG. 2 through FIG. 11, closed end portions 61A, 62A, 63-1A, 63-2A, 64A, 65-1A, 65-2A, 66A, 67A, 68A, 69A and 610A of the respective first oil grooves and closed end portions 71A, 72A, 73A, 74-1A, 74-2A, 75-1A, 75-2A, 76A, 77A, 78A, 79A and 710-1A of the respective second oil grooves are located beyond radial center lines of the corresponding segment pieces, respectively. On the other hand, a closed end portion 710-2A of each short oil groove 710-2 in FIG. 11 is located short of the radial center line of the corresponding segment piece. Owing to the locations of the respective closed end portions, the respective oil grooves can better exhibit their functions.

Figure 12:
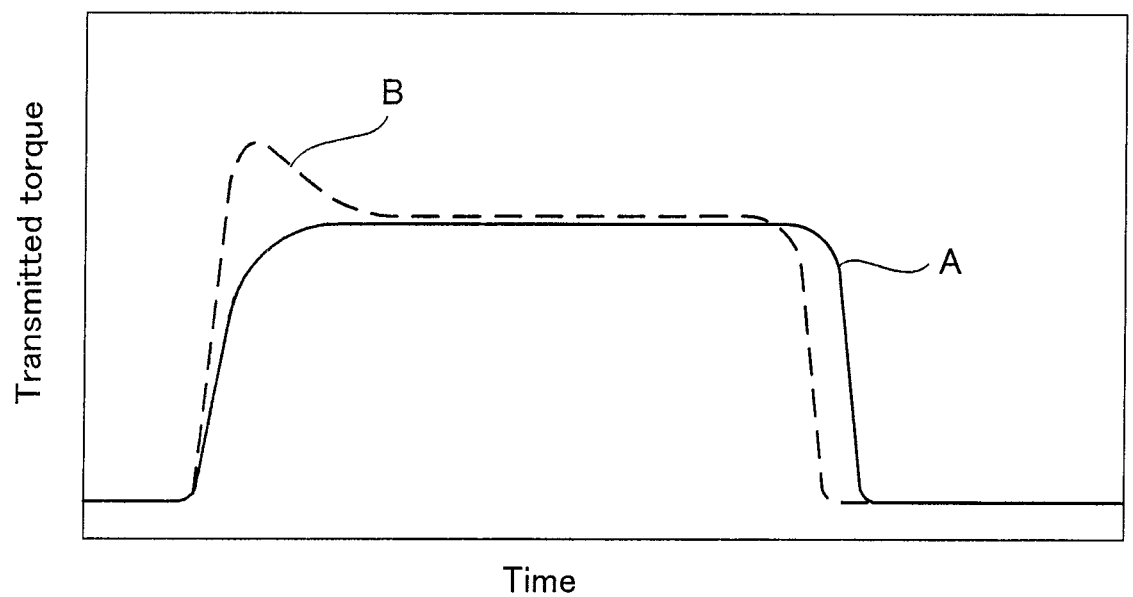
FIG. 12 is a graph illustrating advantageous effects of the present invention.

FIG. 12 diagrammatically illustrates advantageous effects of the present invention, in which transmission torque is plotted along the ordinate while time is plotted along the abscissa.

A broken line B shows time-torque characteristics of a conventional clutch, and the conventional clutch was unable to avoid the occurrence of a large grabbing toque in an initial stage of clutch engagement. A solid line A corresponds to the present invention, and indicates the availability of a uniform transmission torque throughout clutch engagement.

The invention claimed is:

1. A friction plate for a wet-type multiplate clutch, said friction plate being provided with a core plate and friction linings bonded on opposite sides of said core plate, respectively, each of said friction linings being composed of plural segment pieces each having at least one first oil groove and at least one second oil groove, said first oil groove opening to a radially-inner side of its corresponding segment piece and having a closed end portion located in a radially-intermediate part of the corresponding segment piece, and said second oil groove opening to a radially-outer side of the corresponding segment piece and having a closed end portion located in another radially-intermediate part of the corresponding segment piece, wherein:
   each segment piece is provided with at least one press-formed oil groove as one of said first and second oil grooves and at least one punched-out oil groove as the other one of said first and second oil grooves, wherein the at least one press-formed oil groove extends to at least one of an outer most radial edge of the segment piece and an inner most radial edge of the segment piece, and
   each segment piece is symmetrical with respect to a radial center line of the friction plate.

2. A friction plate according to claim 1, wherein said first oil groove is a press-formed oil groove and said second oil groove is a punched-out oil groove.

3. A friction plate according to claim 1, wherein said first oil groove is a punched-out oil groove and said second oil groove is a press-formed oil groove.

4. A friction plate according to claim 1, wherein each segment piece is provided with a plurality of first oil grooves, and said plurality of first oil grooves consist of a combination of at least one press-formed oil groove and at least one punched-out oil groove.

5. A friction plate according to claim 1, wherein each segment piece is provided with a plurality of second oil grooves, and said plurality of second oil grooves consist of a combination of at least one press-formed oil groove and at least one punched-out oil groove.

6. A friction plate according to claim 1, wherein one of said first oil groove and second oil groove is a press-formed oil groove, and the other one of said first oil groove and second oil groove is a punched-out oil groove.

7. A friction plate according to claim 1, wherein at least one of said first oil groove and second oil groove is a combined punched-out/press-formed oil groove having a punched-out groove portion and a press-formed groove portion in combination within a single groove.

8. A friction plate according to claim 1, wherein in each of said friction linings, said plural segment pieces are bonded at angular intervals on the corresponding side of said core plate.

9. A friction plate according to claim 1, wherein in each segment piece, at least one of said closed end portions of said first and second oil grooves is located beyond a radial center line of said friction lining.

10. A friction plate for a wet-type multiplate clutch, said friction plate being provided with a core plate and friction linings bonded on opposite sides of said core plate, respectively, each of said friction linings being composed of plural segment pieces each having at least one first oil groove and at least one second oil groove, said first oil groove opening to a radially-inner side of its corresponding segment piece and having a closed end portion located in a radially-intermediate part of the corresponding segment piece, and said second oil groove opening to a radially-outer side of the corresponding segment piece and having a closed end portion located in another radially-intermediate part of the corresponding segment piece, wherein:
   each segment piece is provided with at least one press-formed oil groove as one of said first and second oil grooves and at least one punched-out oil groove as the other one of said first and second oil grooves, wherein each of said first oil groove and said second oil groove include only one of the press-formed oil groove and the punched-out oil groove, and
   each segment piece is symmetrical with respect to a radial center line of the friction plate.

* * * * *